United States Patent [19]
Meguro et al.

[11] 3,907,820
[45] Sept. 23, 1975

[54] BENZODIAZEPINE DERIVATIVES

[75] Inventors: Kanji Meguro, Nishinomiya; Yutaka Kuwada, Ashiya, both of Japan

[73] Assignee: Takeda Chemical Industries, Ltd., Japan

[22] Filed: Mar. 5, 1970

[21] Appl. No.: 16,970

[30] Foreign Application Priority Data
Mar. 8, 1969  Japan.................. 44-17663

[52] U.S. Cl. ....... 260/308 R; 260/239 BD; 424/269
[51] Int. Cl.² ............... C07D 243/20; C07D 487/04
[58] Field of Search ............................ 260/308 R

[56] References Cited
UNITED STATES PATENTS

| | | | |
|---|---|---|---|
| 3,464,978 | 9/1969 | Earley et al. | 260/239 |
| 3,498,973 | 3/1970 | Metlesics et al. | 260/239 |
| 3,523,939 | 8/1970 | Fryer et al. | 260/239 |

*Primary Examiner*—Alton D. Rollins
*Attorney, Agent, or Firm*—Wenderoth, Lind & Ponack

[57] ABSTRACT

Benzodiazepine compounds of the formula

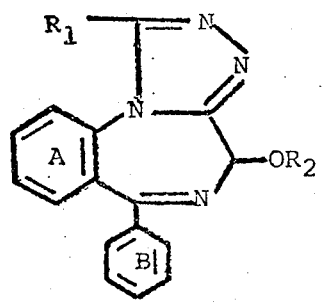

wherein $R_1$ is hydrogen or a hydrocarbon residue, $R_2$ is hydrogen or a lower alkyl group, the rings A and B are unsubstituted or substituted by one or more of nitro, trifluoromethyl, halogen, alkyl and alkoxy groups are produced by reacting a compound of the formula

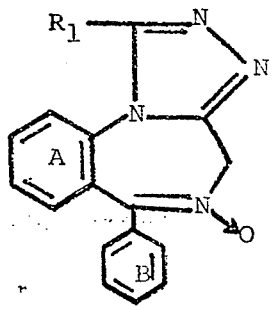

with a reactive derivative of a carboxylic acid to produce a compound of the formula

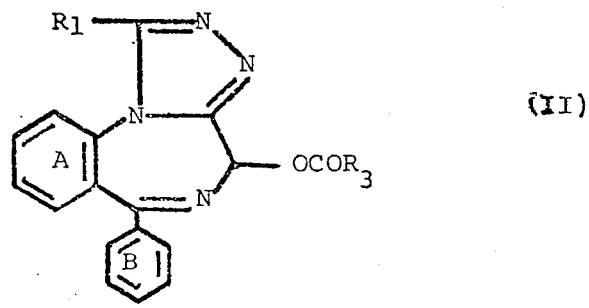

(I) wherein —$OCOR_3$ is an acyloxy group convertible to a hydroxy or alkoxy group and subjecting compounds II to hydrolysis or alcoholysis and optionally subjecting the compounds I wherein $R_2$ is hydrogen to etherification. Compounds I and II are useful as anticonvulsants, sedatives and tranquilizing agents.

12 Claims, No Drawings

BENZODIAZEPINE DERIVATIVES

This invention relates to novel and useful benzodiazepine derivatives of the general formula (I)

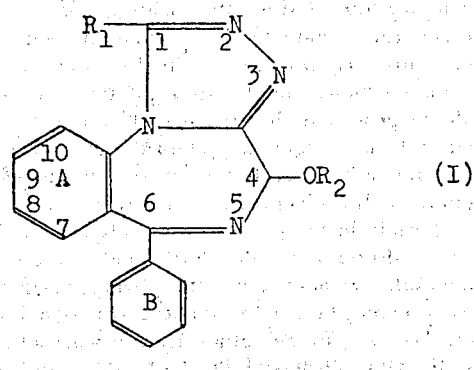

wherein $R_1$ is hydrogen or a hydrocarbon residue, $R_2$ is hydrogen or lower alkyl, the rings A and B are unsubstituted or substituted by one or more of nitro, trifluoromethyl, halogen, alkyl and alkoxy groups, which can be the same or different, and also relates to a novel and useful process for producing the benzodiazepine derivatives (I).

The present invention is further concerned with novel and useful intermediates of the following general formula (II) for the production of the benzodiazepine derivatives (I) and with a novel and useful process for the production of the intermediates;

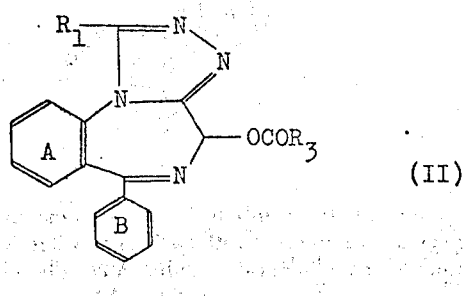

wherein —$OCOR_3$ is an acyloxy group convertible to hydroxy or alkoxy group, and the other symbols have the same meanings as given above.

The object benzodiazepine derivatives (I) of the present invention are useful, for example, as anticonvulsants, sedatives and tranquilizing agents without causing undesirable side effects.

Referring to the general formula (I), as the hydrocarbon residue represented by $R_1$, there are generally mentioned those having 1 to 8 carbon atoms, which include alkyl of up to 6 carbon atoms (e.g., methyl, ethyl, propyl, isopropyl, butyl, sec-butyl, tert-butyl, amyl and hexyl), aralkyl (e.g. benzyl and phenethyl) and aryl (e.g. phenyl). The lower alkyl of $R_2$ is that having 1 to 4 carbon atoms, which is exemplified by methyl, ethyl, propyl, isopropyl, butyl, tert-butyl, etc. The rings A and B are unsubstituted or substituted by one or more substituents, which are the same or different, selected from nitro, trifluoromethyl, halogen (i.e. chlorine, fluorine, bromine and iodine), alkyl such as lower alkyl (e.g. methyl, ethyl and propyl) and alkoxy such as lower alkoxy (e.g. methoxy and ethoxy).

The benzodiazepine derivatives (I) of the present invention can be produced by allowing compounds of the general formula (III)

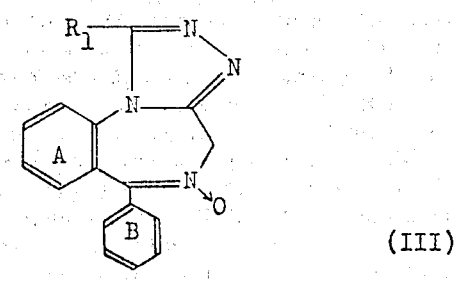

wherein all the symbols have the same meanings as given above, to react with reactive derivatives (IV) of carboxylic acids, the carboxylic acid being represented by the general formula $R_3COOH$, whereby the intermediates (II) are produced, and then subjecting the intermediates (II) to hydrolysis or to alcoholysis, and optionally subjecting the benzodiazepine derivatives (I), wherein $R_2$ is hydrogen, to etherification.

The reactions of the present invention are summarized as in the following scheme:

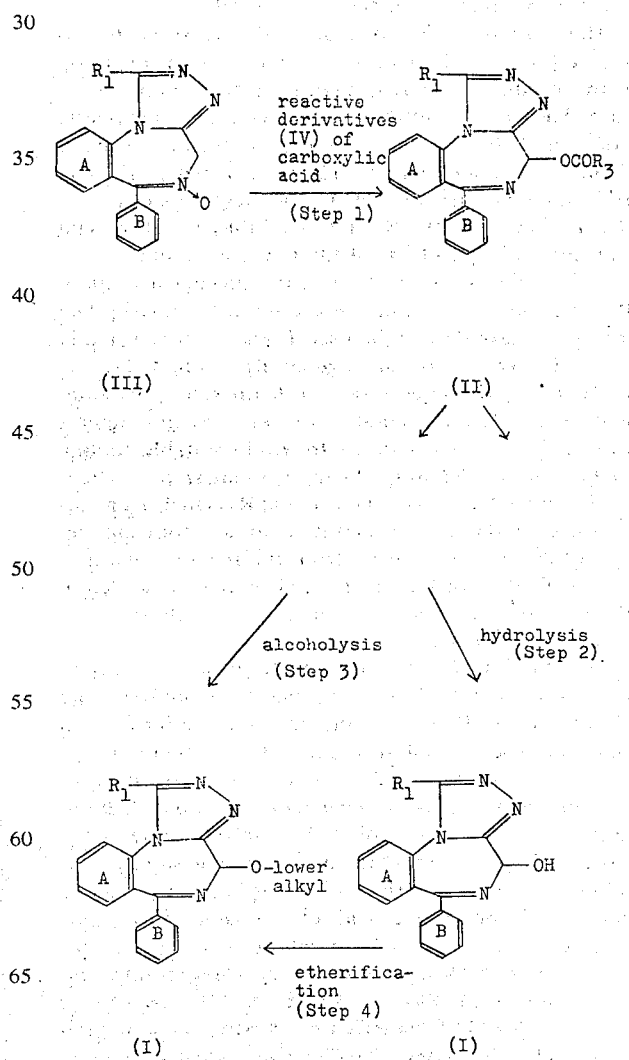

The above steps (1) to (4) will be explained in more detail as follows:

According to the step (1) of the present invention, the compounds (III) are allowed to react with the reactive derivatives (IV) of carboxylic acids. The compounds (III) may be employed in the form of suitable acid salts (e.g. hydrochloride). The reactive derivatives (IV) of carboxylic acids are those derived from carboxylic acids of the general formula $R_3COOH$, wherein $—OCOR_3$ is, as mentioned above, an acyloxy group convertible to a hydroxy or alkoxy group. Preferable examples of the group $R_3$ are hydrocarbons having 1 to 7 carbon atoms, such as alkyls having 1 to 4 carbon atoms, aryls and aralkyls. Typical examples of the carboxylic acid of the general formula $R_3COOH$ include acetic acid, propionic acid, butyric acid, benzoic acid, phenylacetic acid, etc.

The reactive derivatives of the carboxylic acid, which are employed in this method, include acid anhydrides, acid halides (e.g., acid chlorides, acid bromides, etc.) and acid sulfides.

The present reaction of the step (1) is generally conducted by allowing the reactive derivatives (IV) of carboxylic acids to react with the compound (III) in the presence of a suitable solvent with or without heating. The reactive derivatives (IV) of the carboxylic acid may act as a solvent, when they are in a liquid state. Amount of the reactive derivatives (IV) is about 2 to 5 moles per mole of the compound (III).

Thus produced intermediates (II) are subjected to the step (2) or the step (3) of the present invention with or without isolating them from the reaction mixture. The isolation of the intermediates is conveniently conducted, for example, by evaporating the solvent from the reaction mixture. The intermediates (II) may be obtained in the form of suitable acid salts (e.g., hydrochloride), and for purposes of this invention said salts are the equivalents of the free compounds.

According to the step (2) of the present invention, the intermediates (II) are subjected to hydrolysis. The intermediates (II) may be used in the form of suitable acid salts. The hydrolysis is generally conducted in the presence of alkali (e.g., sodium hydroxide, potassium hydroxide, etc.) in a suitable solvent at room temperature. The reaction can be controlled by suitable cooling or heating, if necessary. In the present step (2) benzodiazepine derivatives (I), wherein $R_2$ is hydrogen, are produced and are conveniently separated, for example, by evaporating the solvent from the reaction mixture. The benzodiazepine derivatives (I) may be obtained in the form of a suitable acid salt (e.g. hydrochloride) by conventional means.

According to the step (3) of the present invention, the intermediates (II) are subjected to alcoholysis. The intermediates (II) may be employed in the form of an acid salt. The alcoholysis is generally conducted by allowing the intermediates (II) to react with alcohols (e.g. methanol, ethanol, propanol, isopropanol, butanol, tert-butanol, etc.) suitable for introduction of the desired alkoxy groups in the presence of acids (e.g., hydrochloric acid, sulfuric acid, phosphoric acid, acetic acid, p-toluenesulfonic acid, etc.) in suitable solvents (e.g., chloroform, carbon tetrachloride, etc.) in a suitable temperature range between room temperature and the boiling point of the solvent used. The alcohol may act as the solvent. Thus produced benzodiazepine derivatives (I) wherein $R_2$ is lower alkyl, are conveniently separated, for example, by evaporating the solvent from the reaction mixtures. The benzodiazepine derivatives (I) may be obtained in the form of acid salts which are the equivalents of the free compounds.

According to the step (4) of the present invention, the benzodiazepine derivatives (I) wherein $R_2$ is hydrogen, are subjected to etherification. The etherification is generally conducted by allowing the benzodiazepine derivatives (I) wherein $R_2$ is hydrogen, to react with an alcohol which is suitable for introduction of the desired alkoxy groups, in the presence of suitable solvents (e.g. chloroform, carbon tetrachloride, etc.) in a temperature range between room temperature and the boiling point of the solvent used. This reaction is conducted preferably in the presence of acids (e.g. hydrochloric acid, sulfuric acid, phosphoric acid, acetic acid, p-toluenesulfonic acid, etc.). The benzodiazepine derivatives (I) may be employed in the form of acid salts. The alcohol used for the etherification may act as the solvent. Thus produced benzodiazepine derivatives (I) wherein $R_2$ is lower alkyl, are conveniently separated, for example, by evaporating the solvent from the reaction mixture. The benzodiazepine derivatives (I) wherein $R_2$ is lower alkyl, may be obtained in the form of suitable acid salts (e.g. hydrochlorides).

The starting compounds (III) which are employable in the present invention can be prepared, for example, by allowing the compounds of the general formula (V)

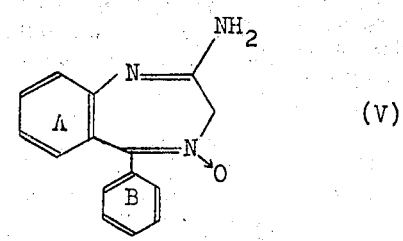

(V)

wherein all the symbols have the same meanings as given above, to react with hydrazine, whereby the compounds of the general formula (VI),

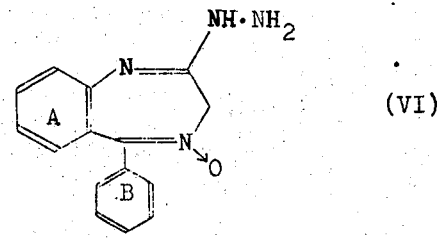

(VI)

are produced, and then by allowing the thus produced compounds (VI) to react with orthoesters of the general formula $R_1C(OR_4)_3$ wherein $R_1$ has the same meaning as given above and $R_4$ represents lower alkyl such as methyl and ethyl. The starting compounds (III) can also be prepared by allowing the compounds (VI) to react with a carboxylic anhydride of the general formula $(R_1—CO)_2O$, or an acyl halide of the general formula $R_1—COX$ (wherein X is halogen), whereby the compounds of the general formula (VII)

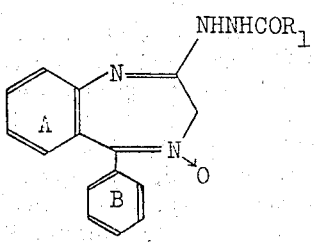

are produced, and then by subjecting the thus produced compounds (VII) to cyclization.

The above two reactions for the production of the starting compounds (III) are schematically represented as follows:

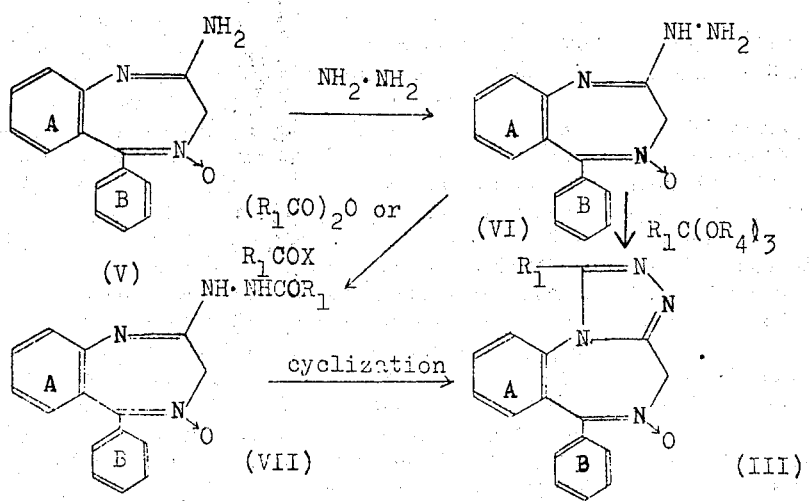

Thus obtained benzodiazepine derivatives (I) as well as their salts are novel compounds and show anticonvulsant, sedative and taming effects without causing any undesirable side effects. Therefore, they are useful as anticonvulsants, sedatives and tranquilizing agents. For such purposes, the benzodiazepine derivatives (I) as well as their pharmaceutically acceptable acid salts (e.g., inorganic acid salt such as hydrochloride, hydrogen sulfate) are orally or parenterally administered per se or in a suitable form such as powder, granules, tablets or injectable solutions admixed with a pharmaceutically acceptable carrier or diluent. The dose of the benzodiazepine derivatives (I) or their acid salts to be administered varies depending on the kinds of the compounds, the severity of the disease, etc., but generally falls within the range of from about 1 to about 30 milligrams for oral administration, and about 0.5 to about 10 milligrams for parenteral administration for an adult human per day.

The compounds (II) are useful not only as intermediates for the production of the benzodiazepine derivatives (I) of the present invention, but also as medicines producing medicinal effects similar to those of the benzodiazepine derivatives (I) of the present invention.

For further detailed explanation of the present invention, the following references and examples are given, wherein the term "part(s)" means "weight part(s)" unless otherwise specified, and the relationship between "part(s)" and "part(s) by volume" corresponds to that between gram(s) and milliliter(s).

REFERENCE 1

To a mixture of 3 parts of 2-amino-7-nitro-5-phenyl-3H-1,4-benzodiazepine 4N-oxide and 100 parts by volume of ethanol are added 2.5 parts by volume of 100% hydrazine hydrate and 1.8 parts by volume of acetic acid. The whole mixture is slightly warmed on a water bath for a while to result in a solution and stirred at room temperature for about 20 minutes. The precipitated crystals are collected, and washed with ethanol and then with diethyl ether, whereby 2-hydrazino-7-nitro-5-phenyl-3H-1,4-benzodiazepine 4H-oxide is yielded as yellow needles melting at 176°C (sintering), 226°C (decomposition).

Elemental analysis $C_{15}H_{13}N_5O_3$; Calculated: C 57.87, H 4.21, N 22.50; Found: C 57.98, H 4.01, N 22.26.

To a suspension of 1.55 parts of 2-hydrazino-7-nitro-5-phenyl-3H-1,4-benzodiazepine 4N-oxide in 100 parts by volume of ethanol is added 3.7 parts of ethyl orthoformate, and then 0.6 part by volume of concentrated sulfuric acid, whereby the solid substance is dissolved and then yellow crystals are precipitated. After stirring for 30 minutes, the mixture is neutralized with a saturated aqueous solution of sodium bicarbonate. The crystals are collected and washed with water, ethanol and then diethyl ether, whereby 8-nitro-6-phenyl-4H-s-triazolo[4,3-a][1,4]-benzodiazepine 5N-oxide is yielded as yellow crystals. Recrystallization from an aqueous dimethylformamide yields yellow crystals melting at 274°C to 275°C (decomposition).

Elemental analysis: $C_{16}H_{11}N_5O_3$; Calculated: C 59.81, H 3.45, N 21.80; Found: C 59.58, H 3.48, N 21.56.

REFERENCE 2

To a suspension of 14.3 parts of 2-amino-7-chloro-5-phenyl-3H-1,4-benzodiazepine 4N-oxide in 400 parts by volume of methanol are added 12.5 parts by volume of 100% hydrazine hydrate and 10 parts by volume of methanol saturated with hydrogen chloride. The mixture is refluxed for 10 minutes and the resulting solution is concentrated to half the initial volume. The concentrate is poured into 500 parts by volume of water and the resulting oily substance is extracted with chloroform. The chloroform layer is dried over sodium sulfate and evaporated. Treatment of the residue with diethyl ether gives 7-chloro-2-hydrazino-5-phenyl-3H-1,4-benzodiazepine 4N-oxide as pale yellow powdery crystals melting at 262°C to 263°C.

Elemental analysis: $C_{15}H_{13}ClN_4O$; Calculated: C 59.90, H 4.36, N 18.63; Found: C 60.05, H 4.13, N 18.41.

To a mixture of 1.5 parts of 7-chloro-2-hydrazino-5-phenyl-3H-1,4-benzodiazepine 4N-oxide, 50 parts by volume of tetrahydrofuran and 1 part by volume of triethylamine is added 0.5 part by volume of acetic anhydride with stirring. The whole mixture is stirred for about 1 hour, followed by the addition of water, whereby 2-(2-acetylhydrazino)-7-chloro-5-phenyl-3H-1,4-benzodiazepine 4N-oxide is yielded as crystals. Recrystallization from a mixture of dimethylformamide and water yields fine needles melting at 256°C to 258°C (decomposition).

Elemental analysis: $C_{17}H_{15}ClN_4O_2$; Calculated: C 59.56, H 4.41, N 16.35; Found: C 59.38, H 4.55, N 16.30.

A mixture of 3.4 parts of 2-(2-acetylhydrazino)-7-chloro-5-phenyl-3H-1,4-benzodiazepine 4N-oxide, and 30 parts by volume of pyridine is refluxed for 4 hours, followed by evaporation of the pyridine under reduced pressure. The rsidue is recrystallized from methanol, whereby 8-chloro-1-methyl-6-phenyl-4H-s-triazolo[4,3-a][1,4]-benzodiazepine 5N-oxide is yielded as needles melting at 272°C to 274°C (decomposition).

Elemental analysis: $C_{17}H_{13}ClN_4O$; Calculated: C 62.87, H 4.03, N 17.25; Found: C 63.04, H 4.04, N 17.26.

Any other starting compounds can also be prepared in a similar manner to the above References.

EXAMPLE 1

A mixture of 1.5 parts of 8-chloro-6-phenyl-4H-s-triazolo[4,3-a][1,4]benzodiazepine 5-N-oxide and 50 parts by volume of acetic anhydride is heated at 90°C for 1.5 hours, followed by evaporation of the solvent under reduced pressure. The residue is treated with diethyl ether, whereby 4-acetoxy-8-chloro-6-phenyl-4H-s-triazolo[4,3-a][1,4]-benzodiazepine is yielded as crystals. Recrystallization from methanol yields colorless needles melting at 232° to 233°C.

Elemental analysis: $C_{18}H_{13}ClN_4O_2$; Calculated: C 61.28, H 3.71, N 15.88; Found: C 61.56, H 3.72, N 15.95.

EXAMPLE 2

A mixture of 1.5 parts of 8-chloro-6-phenyl-4H-s-triazolo[4,3-a][1,4]benzodiazepine 5N-oxide and 50 parts by volume of acetylchloride is heated at 50°C for 10 minutes and then stirred at room temperature for 2 hours, followed by evaporation of the acetylchloride under reduced pressure. The residue is neutralized with a saturated aqueous solution of sodium bicarbonate, whereby 4-acetoxy-8-chloro-6-phenyl-4H-s-triazolo[4,3-a][1,4]-benzodiazepine is yielded as crystals. Recrystallization from methanol yields colorless needles melting at 231° to 232°C.

Thus yielded compound is identical with the one obtained in Example 1.

EXAMPLE 3

A mixture of 3.25 parts of 8-chloro-1-methyl-6-phenyl-4H-s-triazolo[4,3-a][1,4]benzodiazepine 5N-oxide and 60 parts by volume of acetic anhydride is heated at 90°C for 2 hours, followed by evaporation of the solvent under reduced pressure. The residue is treated with diethyl ether, whereby 4-acetoxy-8-chloro-1-methyl-6-phenyl-4H-s-triazolo[4,3-a][1,4]benzodiazepine is yielded as crystals. Recrystallization from a mixture of methanol and petroleum ether yields colorless needles melting at 229° to 230°C (decomposition).

Elemental analysis: $C_{19}H_{15}ClN_4O_2$; Calculated: C 62.21, H 4.12, N 15.28; Found: C 62.23, H 3.83, N 15.42.

EXAMPLE 4

A mixture of 3.3 parts of 8-chloro-1-ethyl-6-phenyl-4H-s-triazolo[4,3-a][1,4]benzodiazepine 5N-oxide and 100 parts by volume of acetic anhydride is heated at 90°C for 2.5 hours. The solvent is removed by distillation under reduced pressure and water is added to the residue, whereby 4-acetoxy-8-chloro-1-ethyl-6-phenyl-4H-s-triazolo[4,3-a][1,4]benzodiazepine is yielded as an oil. The oil is extracted with chloroform and the chloroform and the chloroform layer is washed with water and dried. After evaporation of the solvent, the residue is dissolved in 50 parts by volume of ethanol, followed by the addition of 5 parts by volume of 4N aqueous sodium hydroxide solution. The mixture is left standing at room temperature for 30 minutes and acidified by the addition of acetic acid. The solvent is evaporated and the residue is treated with an aqueous ethanol, whereby 8-chloro-1-ethyl-4-hydroxy-6-phenyl-4H-s-triazolo[4,3-a][1,4] -benzodiazepine is yielded as crystals. Recrystallization from methanol yields colorless prisms melting at 254° to 255°C.

Elemental analysis: $C_{18}H_{15}ClN_4O$; Calculated: C 63.81, H 4.46, N 16.54; Found: C 63.97, H 4.58, N 16.61.

EXAMPLE 5

A suspension of 3.2 parts of 8-nitro-6-phenyl-4H-s-triazolo[4,3-a][1,4]benzodiazepine 5N-oxide in 100 parts by volume of acetic anhydride is heated at 90°C for 3 hours, followed by evaporation of the solvent. Treatment of the residue with diethyl ether gives 4-acetoxy-8-nitro-6-phenyl-4H-s-triazolo[4,3-a][1,4]benzodiazepine as crystals. Recrystallization from a mixture of tetrahydrofuran and diethyl ether gives colorless prisms melting at 253° to 254°C (decomposition).

Elemental analysis: $C_{18}H_{13}N_5O_4$; Calculated: C 59.50, H 3.61, N 19.28; Found: C 59.44, H 3.62, N 18.99.

EXAMPLE 6

A mixture of 3.53 parts of 4-acetoxy-8-chloro-6-phenyl-4H-s-triazolo[4,3-a][1,4]benzodiazepine, 50 parts by volume of ethanol and 6 parts by volume of 4N aqueous sodium hydroxide solution is left standing at room temperature for 30 minutes, followed by acidification with acetic acid. The solvent is evaporated from the mixture under reduced pressure and water is added to the residue, whereby 8-chloro-4-hydroxy-6-phenyl-4H-s-triazolo[4,3-a][1,4]benzodiazepine is yielded as crystals. Recrystallization from methanol yields colorless prisms melting at 241° to 242°C.

Elemental analysis: $C_{16}H_{11}ClN_4O$; Calculated: C 61.84, H 3.57, N 18.03; Found: C 61.77, H 3.45, N 17.81.

EXAMPLE 7

To a suspension of 3.7 parts of 4-acetoxy-8-chloro-1-methyl-6-phenyl-4H-s-triazolo[4,3-a][1,4]benzodiazepine in 100 parts by volume of ethanol is added 6 parts by volume of 4N aqueous sodium hydroxide solution. After stirring the mixture for about 15 minutes, the resulting solution is acidified with acetic acid. Evaporation of the solvent and then addition of water to the residue affords 8-chloro-4-hydroxy-1-methyl-6-phenyl-4H-s-triazolo-[4,3-a][1,4]benzodiazepine as crystals. Recrystallization from a mixture of dimethylformamide and water yields its hemihydrate as colorless needles melting at 245.5°C (decomposition).

Elemental analysis: $C_{17}H_{13}ClN_4O \cdot 1/2H_2O$; Calculated: C 61.17, H 4.22, N 16.79; Found: C 61.06, H 4.37, N 16.87.

EXAMPLE 8

To a suspension of 1.2 parts of 4-acetoxy-8-nitro-6-phenyl-4H-s-triazolo[4,3-a][1,4]benzodiazepine in 15 parts by volume of ethanol is added 6.6 parts by volume of 1N aqueous sodium hydroxide solution, and the mixture is left standing at room temperature for about 10 minutes. The resulting solution is acidified with acetic acid, whereby 4-hydroxy-8-nitro-6-phenyl-4H-s-triazolo[4,3-a][1,4]-benzodiazepine is yielded as crystals. Recrystallization from aqueous dimethylformamide yields yellow crystals melting at 236.5°C (decomposition).

Elemental analysis: $C_{16}H_{11}N_5O_3$; Calculated: C 59.81, H 3.45, N 21.80; Found: C 59.45, H 3.70, N 21.77.

EXAMPLE 9

To a suspension of 1.5 parts of 8-chloro-4-hydroxy-6-phenyl-4H-s-triazolo[4,3-a][1,4]benzodiazepine in 100 parts by volume of methanol is added 0.5 part by volume of glacial acetic acid, and then the mixture is refluxed for 3.5 hours. Evaporation of the solvent yields 8-chloro-4-methoxy-6-phenyl-4H-s-triazolo[4,3-a][1,4]benzodiazepine as colorless crystals. Recrystallization from methanol yields colorless needles melting at 270° to 271°C (decomposition).

Elemental analysis: $C_{17}H_{13}ClN_4O$; Calculated: C 62.87, H 4.03, N 17.25; Found: C 63.06, H 3.88, N 17.12.

EXAMPLE 10

To a suspension of 1.2 parts of 4-acetoxy-8-chloro-6-phenyl-4H-s-triazolo[4,3-a][1,4]benzodiazepine in 50 parts by volume of methanol is added 0.5 part by volume of glacial acetic acid. The mixture is refluxed for 4 hours and then left standing at room temperature, whereby 8-chloro-4-methoxy-6-phenyl-4H-s-triazolo[4,3-a][1,4]-benzodiazepine is yielded as crystals melting at 269° to 270°C (decomposition). Thus yielded compound is identical with the compound obtained in Example 9.

What we claim is:

1. A member selected from the group consisting of a compound of the formula

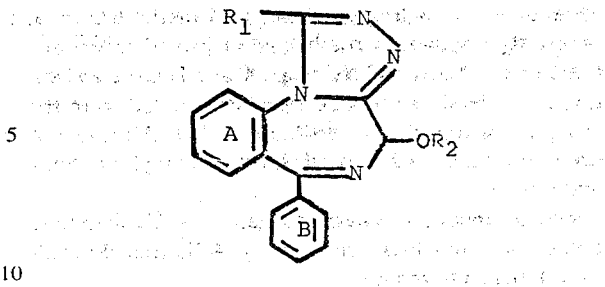

wherein $R_1$ is hydrogen or alkyl of up to 6 carbon atoms, $R_2$ is hydrogen or lower alkyl, the rings A and B are unsubstituted or substituted by one member selected from the group consisting of nitro, trifluoromethyl, halogen, lower alkyl and lower alkoxy, which can be the same or different, and pharmaceutically acceptable acid salts thereof.

2. A compound according to claim 1, said compound being 8-chloro-4-hydroxy-6-phenyl-4H-s-triazolo-[4,3-a][1,4]benzodiazepine.

3. A compound according to claim 1, said compound being 8-chloro-4-hydroxy-1-methyl-6-phenyl-4H-s-triazolo[4,3-a][1,4]benzodiazepine.

4. A compound according to claim 1, said compound being 8-chloro-1-ethyl-4-hydroxy-6-phenyl-4H-s-triazolo[4,3-a][1,4benzodiazepine.

5. A compound according to claim 1, said compound being 4-hydroxy-8-nitro-6-phenyl-4H-s-triazolo-[4,3-a][1,4]benzodiazepine.

6. A compound according to claim 1, said compound being 8-chloro-4-methoxy-6-phenyl-4H-s-triazolo-[4,3-a][1,4]benzodiazepine.

7. A compound selected from the group consisting of a compound of the formula

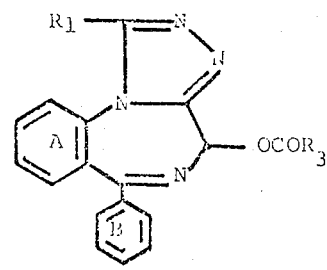

wherein $R_1$ is hydrogen or alkyl of up to 6 carbon atoms, $R_3$ is alkyl of 1–4 carbon atoms and the rings A and B are unsubstituted or substituted by one member selected from the group consisting of nitro, trifluoromethyl, halogen, lower alkyl and lower alkoxy, which can be the same or different, and acid salts thereof.

8. A compound of the formula

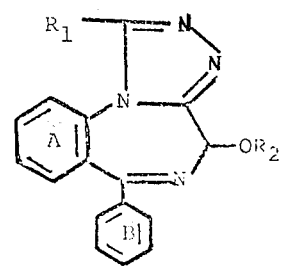

wherein $R_1$ is hydrogen or alkyl of up to 6 carbon atoms, $R_2$ is hydrogen, methyl, ethyl, propyl, isopropyl, butyl or tert-butyl and the rings A and B are unsubstituted or substituted by one member selected from the group consisting of nitro, trifluoromethyl, chlorine, fluorine, bromine, iodine, methyl, ethyl, propyl, methoxy and ethoxy.

9. A compound according to claim 7, said compound being 4-acetoxy-8-chloro-6-phenyl-4H-s-triazolo-[4,3-a][1,4]benzodiazepine.

10. A compound according to claim 7, said compound being 4-acetoxy-8-chloro-1-methyl-6-phenyl-4H-s-triazolo[4,3-a][1,4]benzodiazepine.

11. A compound according to claim 7, said compound being 4-acetoxy-8-chloro-1-ethyl-6-phenyl-4H-s-triazolo[4,3-a][1,4]benzodiazepine.

12. A compound according to claim 7, said compound being 4-acetoxy-8-nitro-6-phenyl-4H-s-triazolo-[4,3-a][1,4]benzodiazepine.

* * * * *